US012812565B2

(12) United States Patent
Schreiber et al.

(10) Patent No.: US 12,812,565 B2
(45) Date of Patent: Nov. 24, 2026

(54) METHOD FOR TRANSMIT POWER ADJUSTMENT IN A WIRELESS COMMUNICATION NETWORK

(71) Applicant: Rohde & Schwarz GmbH & Co. KG, Munich (DE)

(72) Inventors: Joachim Schreiber, Essen (DE); Andreas Holtkamp, Wuerselen (DE); Rasmus Wormstaedt, Aachen (DE); Kevin Schwarz, Gangelt (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 279 days.

(21) Appl. No.: 18/380,459

(22) Filed: Oct. 16, 2023

(65) Prior Publication Data

US 2025/0126575 A1 Apr. 17, 2025

(51) Int. Cl.

| | |
|---|---|
| ***H04B 7/185*** | (2006.01) |
| ***H04B 17/00*** | (2015.01) |
| ***H04W 52/24*** | (2009.01) |
| ***H04W 52/36*** | (2009.01) |

(52) U.S. Cl.
CPC ...... *H04W 52/367* (2013.01); *H04B 17/0085* (2013.01); *H04W 52/245* (2013.01)

(58) Field of Classification Search
CPC .............. H04W 52/367; H04W 52/245; H04B 17/0085
USPC .......................................................... 370/318
See application file for complete search history.

(56) References Cited

U.S. PATENT DOCUMENTS

| | | | | |
|---|---|---|---|---|
| 6,735,448 | B1 | 5/2004 | Krishnamurthy et al. | |
| 6,859,463 | B1 | 2/2005 | Mayor et al. | |
| 2002/0044533 | A1 | 4/2002 | Bahl et al. | |
| 2004/0092281 | A1 | 5/2004 | Burchfiel | |
| 2006/0094370 | A1 | 5/2006 | Nguyen | |
| 2011/0244853 | A1 | 10/2011 | Sheikh et al. | |
| 2012/0135777 | A1* | 5/2012 | Karpoor | H04W 52/146 455/67.11 |
| 2013/0065525 | A1* | 3/2013 | Kiukkonen | H04W 52/36 455/41.2 |
| 2015/0049745 | A1 | 2/2015 | Han et al. | |
| 2015/0319700 | A1 | 11/2015 | Oteri et al. | |

(Continued)

OTHER PUBLICATIONS

Office Action for related European Application No. 24161063.3-1206, dated Aug. 8, 2024, 7 pages.

*Primary Examiner* — Temica M Beamer
(74) *Attorney, Agent, or Firm* — DITTHAVONG, STEINER & MLOTKOWSKI

(57) ABSTRACT

The present disclosure relates to a method for transmit power adjustment in a wireless communication network which comprises a plurality of radio access entities. The method comprises the steps of: obtaining, for one radio access entity of the plurality of radio access entities: (i) information on received signal strengths of a first wireless test signal which is transmitted from at least some radio access entities of the plurality of radio access entities and received by the one radio access entity and, and/or (ii) information on received signal strengths of a second wireless test signal which is transmitted from the one radio access entity and received by at least some radio access entities of the plurality of radio access entities; analyzing the obtained information; and adjusting a signal transmit power of the one radio access entity on the basis of said analysis.

11 Claims, 9 Drawing Sheets

(56) References Cited

U.S. PATENT DOCUMENTS

| | | | | |
|---|---|---|---|---|
| 2016/0037370 | A1 | 2/2016 | Futaki et al. | |
| 2019/0132806 | A1 | 5/2019 | Kumar et al. | |
| 2019/0200363 | A1 | 6/2019 | Rajendran | |
| 2020/0288415 | A1 | 9/2020 | Kunkati et al. | |
| 2023/0239699 | A1* | 7/2023 | Fang ..................... | H04W 16/02 370/254 |

* cited by examiner

METHOD FOR TRANSMIT POWER ADJUSTMENT IN A WIRELESS COMMUNICATION NETWORK

TECHNICAL FIELD

The present disclosure relates to a method for transmit power adjustment in a wireless communication network, such as a WiFi network. The present disclosure further relates to a wireless communication system.

BACKGROUND ART

Access points are devices in a wireless network, e.g. a WiFi network, that facilitate wireless communication between client devices. They typically operate within a certain transmit power range. Thereby, the selected transmit power of the access points directly influences a "cell size" (i.e., an area of coverage).

A large number of access points in a wireless network can cause an undesirable cell overlap in the same frequency range, which can have a negative effect on data throughput when the data load is high. In general, the greater the transmit power of the access points, the more frequently undesirable and power-reducing cell overlaps occur. With very large cells, there are can be further radio inefficiencies in case of client devices that are operating at the cell edge, which can further reduce the performance of the radio cells.

However, the smaller the transmit power of the access points in the wireless network, the greater the likelihood that areas of poor signal coverage will occur between the different access points. This can cause inefficient operation of client devices in these areas of poor coverage, which also reduces the performance of the radio cells.

To provide a performative wireless network, in particular with a large number of access points, the transmit power of each access point should be manually adjusted to an optimized value. However, this requires experience as well as planning tools and measurement equipment that might not always be available to the network operator.

Furthermore, local conditions of the network environment (e.g., ceilings and concrete piers; damping or reflective wall surfaces like tile backsplashes or windows; furnishings, such as furniture, metal shelves; or distance between network sockets) are individually different. To optimize the network performance in a specific environment, it is advantageous to perform prior planning and simulations, or to use measurement instruments to manually measure and set the individual transmit powers for each access point. However, such extensive planning and measurements can be expensive in terms of time and resources.

To avoid these efforts, many network operators set their access points to a manufacturer default setting, which often corresponds to the maximum transmit power. However, this can cause the above-mentioned cell overlap issues and radio inefficiencies.

SUMMARY

Thus, there is a need to provide an improved transmit power adjustment in a wireless communication network which avoids the above-mentioned disadvantages.

These and other objectives are achieved by the embodiments provided in the enclosed independent claims. Advantageous implementations of the embodiments of the present disclosure are further defined in the dependent claims.

According to a first aspect, the present disclosure relates to a method for transmit power adjustment in a wireless communication network which comprises a plurality of radio access entities. The method comprises the steps of: obtaining, for one radio access entity of the plurality of radio access entities: information on received signal strengths of a first wireless test signal which is transmitted from at least some radio access entities of the plurality of radio access entities and received by the one radio access entity and, and/or information on received signal strengths of a second wireless test signal which is transmitted from the one radio access entity and received by at least some radio access entities of the plurality of radio access entities. The method comprises the further steps of: analyzing the obtained information; and adjusting a signal transmit power of the one radio access entity on the basis of said analysis.

This achieves the advantage that the transmit power of radio access entities in a wireless network can be adjusted in an efficient manner to improve the network performance. Thereby, the adjustment can be carried out automatically and only requires information on signal transmit powers of test signals. In particular, no client data and no local position data of the radio access entities is required, resulting in significant cost and time savings.

The wireless communication network can be a WiFi network, in particular a IEEE 802.11 WiFi network. The wireless communication network can also be a Bluetooth network, a ZigBee network, a Z-Wave network or a LoRaWAN network.

The radio access entities can be access points of the wireless communication network, e.g. WiFi routers or modules. The radio access entities can be installed in an environment, e.g. a house. In particular, the radio access entities can be mounted in different locations in the environment when carrying out the method according to the first aspect of the disclosure.

The at least some radio access entities which transmit the first test signal can be different to the at least some radio access entities which receive the second test signal. For instance, the at least some radio access entities which receive the second test signal can be further radio access entities. However, the radio access entities which transmit the first test signal and receive the second test signal can also be the same.

The first and/or second test signal are signals within one (in particular, the same) frequency band. The steps of the method can be repeated for different first and second test signals within different frequency bands.

The wireless test signals can be wireless communication signals.

The received signal strength of a wireless test signal can be the signal strength or level of the test signal when received by a radio access entity. This received signal strength is generally lower than the signal strength or level, at which the test signal was transmitted due to attenuation of the signal between transmitter and receiver. The attenuation can depend on the distance between transmitter and the receiver entity and/or on the environment between the transmitter and the receiver entity (e.g., walls . . . ).

The information on a received signal strength can comprise the absolute received signal power of a received test signal or a relative received signal power, for instance a difference between the transmitted signal power and a received power (e.g., information on an attenuation of the test signal).

The received signal strengths of the first test signal can be different depending on which of the at least some radio access entities is transmitting the first test signal. Likewise, the received signal strength of the second test signal can be different depending on which of the at least some radio access entities is receiving the second test signal. In particular, the received signal strength depends on the arrangement of the transmitting and the receiving radio access entity in an environment (e.g., their distance to each other, objects in-between the entities, etc.).

The signal transmit power of a radio accessed entity, which is adjusted based on the analysis, can be the amount of power that the entity emits in the form of electromagnetic waves during normal operation, e.g. when communicating with client devices.

After the signal transmit power of the one radio access entity is adjusted, a further one radio access entity of the plurality of radio access entities can be selected and the steps of the method can be repeated to also adjust the signal transmit power of the further one radio access entity. This procedure can be repeated until the signal transmit power of all radio access entities of the plurality of radio access entities is adjusted. Furthermore, the method can be repeated for different frequencies (or frequency bands) of the test signals.

Thus, the method can be a type of calibration method for the radio access entities, which calibrates the signal transmit power of each radio access entity to an optimized value.

In an implementation form of the first aspect, the first wireless test signal is transmitted from the at least some radio access entities with first signal transmit powers, and/or the second wireless test signal is transmitted from the one radio access entity with a second signal transmit power; wherein the first signal transmit powers and/or the second signal transmit power is taken into account during analysis of the obtained information.

The first and/or the second signal transmit power can be the power(s) at which a radio access entity transmits a respective test signal.

In an implementation form of the first aspect, the first signal transmit powers and/or the second signal transmit power are known from a configuration of the radio access entities which transmit a respective wireless test signal; and/or a radio access entities which transmits a respective wireless test signal is configured to communicate its signal transmit power together with the wireless test signals.

In an implementation form of the first aspect, the step of analyzing the obtained information comprises calculating a metric on the basis of the obtained information.

Furthermore, the metric can be calculated based on the first signal transmit powers and/or the second signal transmit power.

The metric can represents a (HF) density of the radio access points transmitting and/or receiving the wireless test signals. Hereby, the density is an abstract measure of the overlap of signals from different radio access entities in the vicinity of the one radio access entity.

The calculated metric of the one radio access entity can be expressed as a single value (e.g., in dB or dimensionless).

In an implementation form of the first aspect, the metric is calculated as a sum or a weighted sum of: received signal strength values of the first wireless test signal which is transmitted from the at least some radio access entities and received by the one radio access entity, and/or received signal strength values of the second wireless test signal which is transmitted from the one radio access entity and received by the at least some radio access entities.

The received signal strength values can thereby be expressed as a difference between the transmitted signal power (i.e., signal transmit power of the entity transmitting the test signal) and the received power of the test signal.

In particular, each received signal strength value indicates a signal drop and/or attenuation of the respective test signal between transmission and reception.

In an implementation form of the first aspect, when calculating the metric, a received signal strength value of the first wireless test signal and/or a received signal strength value of the second wireless test signal is limited to a maximum value.

For instance, each received signal strength value of the first wireless test signal which is received from one of the at least some radio access entities is limited to a first maximum value; and/or each received signal strength value of the second wireless test signal which is received at one of the at least some radio access entities is limited to a second maximum value. The first and second maximum values can be the same.

This achieves the advantage that the influence of single entities on the metric can be limited. For instance, if the one radio access entity is very close to one of the at least some radio access entities, and further away from the remaining ones of the at least some radio access entities, the receives signal strength value from the closest radio access entity would dominate the metric if it is not limited. This could reduce the significance of the metric.

In an implementation form of the first aspect, the step of analyzing the obtained information further comprises mapping the calculated metric to a target signal transmit power based on a mapping function, wherein the signal transmit power of the one radio access entity is set to the target signal transmit power. This achieves the advantage that the signal transmit power of the one radio access entity can be adjusted in an efficient way based on the metric.

In an implementation form of the first aspect, the mapping function is a monotone function or a step function.

In an implementation form of the first aspect, the method comprises the further step of: adjusting a boundary, a shape and/or an offset of the mapping function. For instance, lower bands (i.e., bands at lower frequencies) are less strongly attenuated by walls, which can be taken into account when adapting the mapping function.

In an implementation form of the first aspect, the adjustment of the mapping function is dependent on the frequency and/or bandwidth of the first and/or the second test signals. This achieves the advantage that the mapping function can be tailored to a specific access point installation, environment or frequency range of the test signals.

In an implementation form of the first aspect, the number of the at least some radio access entities which transmit the first wireless test signal is limited to a first number, and/or the number of the at least some radio access entities which receive the second wireless test signal is limited to a second number.

For instance, the first and/or the second number is smaller than the total number of radio access entities in the wireless communication network. The first and/or the second number of radio access entities can be at least seven. This can be sufficient to provide a good indication of the 3D network density in various geographical configurations. The first and/or the second number can be identical or different.

According to a second aspect, the present disclosure relates to wireless communication system, comprising: a plurality of radio access entities which are connected to a wireless communication network; and a control unit which is configured to obtain, for one radio access entity of the plurality of radio access entities: information on received signal strengths of a first wireless test signal which is transmitted from at least some radio access entities of the plurality of radio access entities and received by the one radio access entity and, and/or information on received signal strengths of a second wireless test signal which is transmitted from the one radio access entity and received by at least some radio access entities of the plurality of radio access entities; wherein the control unit is configured to analyze the obtained information taking into account the first signal transmit powers and/or the second signal transmit power; and wherein the one radio access entity is configured to adjust its signal transmit power on the basis of said analysis.

This achieves the advantage that the transmit power of radio access entities in a wireless network can be adjusted in an efficient manner to improve the network performance. Thereby, the adjustment can be carried out automatically and only requires information on signal transmit powers of test signals. In particular, no client data and no local position data of the radio access entities is required, resulting in significant cost and time savings.

The control unit can be or can comprise a processing unit.

For instance, the control unit can be a component of the one radio access entity and/or can be connected to the at least some radio access entities by means of a communication connection, e.g. a LAN connection.

In an implementation form of the second aspect, the control unit is configured to calculate a metric on the basis of the obtained information.

In an implementation form of the second aspect, the control unit is configured to calculate the metric as a sum or a weighted sum of: received signal strength values of the first wireless test signal which is transmitted from the at least some radio access entities and received by the one radio access entity, and/or received signal strength values of the second wireless test signal which is transmitted from the one radio access entity and received by the at least some radio access entities.

In an implementation form of the second aspect, the control unit is further configured to map the calculated metric to a target signal transmit power based on a mapping function, wherein the one radio access entity is configured to set its signal transmit power to the target signal transmit power.

For example, the control unit is further configured to adjusting a boundary, a shape and/or an offset of the mapping function.

The wireless communication system can be configured to carry out the method according to the first aspect of the disclosure.

The above description with regard to the method according to the first aspect of the disclosure is correspondingly valid for the wireless communication system according to the second aspect of the disclosure.

BRIEF DESCRIPTION OF THE DRAWINGS

The above described aspects and implementation forms of the present disclosure will be explained in the following description of specific embodiments in relation to the enclosed drawings, in which.

DETAILED DESCRIPTIONS OF EMBODIMENTS

Figure 1:
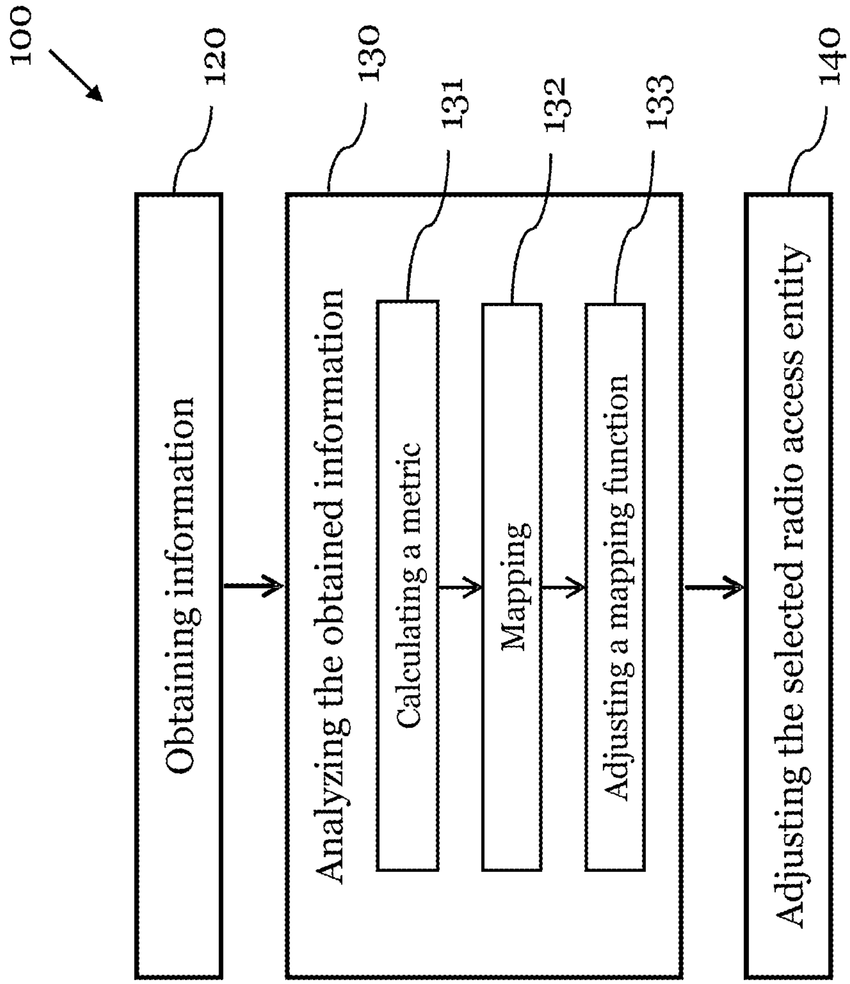
FIG. 1 shows a flow chart of a method for transmit power adjustment in a wireless communication network according to an embodiment.

FIG. 1 shows a flow chart of a method 100 for transmit power adjustment in a wireless communication network according to an embodiment.

The method 100 comprises the steps of: obtaining 120, for one radio access entity: information on received signal strengths of a first wireless test signal which is transmitted from at least some radio access entities of the plurality of radio access entities and received by the one radio access entity and, and/or information on received signal strengths of a second wireless test signal which is transmitted from the one radio access entity and received by at least some radio access entities of the plurality of radio access entities. The method 100 further comprises the steps of: analyzing 130 the obtained information; and adjusting 140 a signal transmit power of the one radio access entity on the basis of the analysis 130.

In particular, the first wireless test signal is thereby transmitted from the at least some radio access entities with first signal transmit powers, and/or the second wireless test signal is transmitted from the one radio access entity with a second signal transmit power. The first signal transmit powers and/or the second signal transmit power can be taken into account during analysis of the obtained information. For instance, an attenuation of a test signals between transmitter and receiver entity can be analyzed.

This method 100 allows to adjust the signal transmit power of a selected radio access entities within a wireless network based on an analysis of signal powers of test signals which are exchanged between the selected radio access entity and further radio access entities in the network. Thereby, no information about coordinates or positions (GPS) of installed radio access entities is required. For instance, no information about the distances between the radio access entities and no information about clients or their perspective on the network is required.

Since the method 100 only requires few input parameters, it could directly implemented within WiFi (or other communication technology) chipsets.

The wireless communication network can be a WiFi network, in particular a IEEE 802.11 WiFi network. The wireless communication network can also be a Bluetooth network or a ZigBee network, a Z-Wave network or a LoRaWAN network.

The radio access entities can be access points of the wireless communication network, e.g. routers. The radio access entities can be installed in an environment, e.g. a house. In particular, the radio access entities can be mounted in different locations in the environment when carrying out the method 100.

The at least some radio access entities which transmit the first test signal can be different to the at least some radio access entities which receive the second test signal. For instance, the at least some radio access entities which receive the second test signal can be further radio access entities. However, the radio access entities which transmit the first test signal and receive the second test signal could also be the same.

For instance, the first and/or the second signal transmit powers are known to the one radio access entity and/or to a control unit which analyzes the obtained information.

The first and/or the second signal transmit power can be known from a previous configuration of the radio access entities in the wireless communication network, in particular of the radio access entities which are selected to transmit a respective wireless test signal. This configuration can be carried out by means of management tools (e.g., via a LAN connection) or via proprietary solutions. For instance, the at least some radio access entities could be controlled by the one radio access point (e.g., over-the-air) to switch to a certain transmit power for transmitting the first wireless test signal.

Alternatively, each radio access entities of the plurality of radio access entities which transmits a respective (first or second) wireless test signal can be configured to communicate its signal transmit power together with the wireless test signals. This information can be transmitted in data packets (e.g., as WiFi-beacons), for instance in the form of TPC reports or proprietary solutions (such as CISCO DTPC). In this way, individual differences between the first signal transmit powers of the at least some radio access entities can be compensated.

In general, each of the at least some radio access entities can transmit the first wireless test signal with different first signal transmit powers.

In an example, the step of analyzing 130 the obtained information comprises calculating 131 a metric on the basis of the obtained information and of the first signal transmit powers and/or the second signal transmit power.

The metric can represent an (RF) density of the radio access entities transmitting and/or receiving the wireless test signals. The density can be an abstract measure of the overlap of signals from different radio access entities in the vicinity of the one radio access entity.

FIGS. 2A-E show the underlying considerations of this metric. Thereby, different arrangements of radio access entities, which exchange mobile test signals, are shown. In particular, FIGS. 2A-E show different “indoor scenarios”, where walls or other signal dampening structures can be arranged between the radio access entities.

Figure 2A:
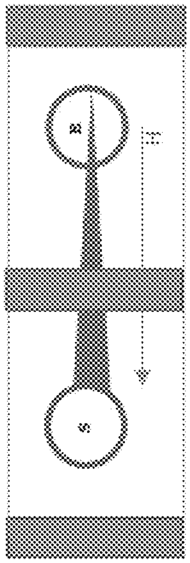
FIGS. 2A-2E show schematic diagrams of different arrangements of radio access entities according to an embodiment.

In FIG. 2A, a transmitter radio access entity S and a receiver radio access entity E are separated by a thick wall (high damping). This reduces the signal strength of the wireless test signal which is transmitted by the transmitter entity S and received at the receiver entity E. Thus, a low density of the radio access entities can be assumed and the receiver access entity E can react by enhancing its own signal transmit power to a higher level (indicated by the letter H).

Figure 2B:
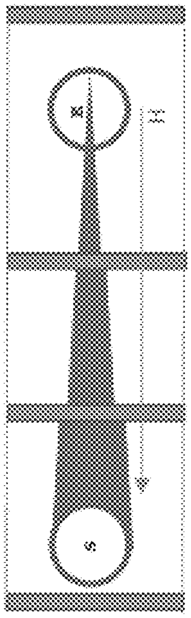

In FIG. 2B, the transmitter radio access entity S and the receiver radio access entity E are separated by two thinner walls (medium damping) and spaced farther apart. This can again result in a reduced signal strength of the test signal which is transmitted by the transmitter entity S and received by the receiver entity E. Again, a low density of the radio access entities can be assumed and the receiver access entity E can react by enhancing its own signal transmit power.

Figure 2C:
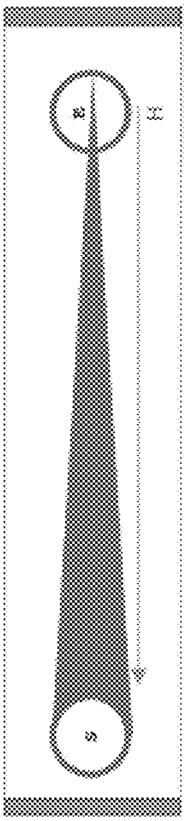

In FIG. 2C, no wall structure is arranged between the transmitter S and receiver E entity (low damping), but both entities are spaced further apart. This can also result in a reduced signal strength of the test signal which is received at the receiver entity E and thus again at a low density of the radio access entities.

Figure 2D:
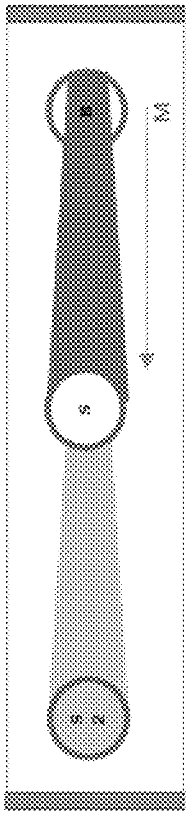
Figure 2E:
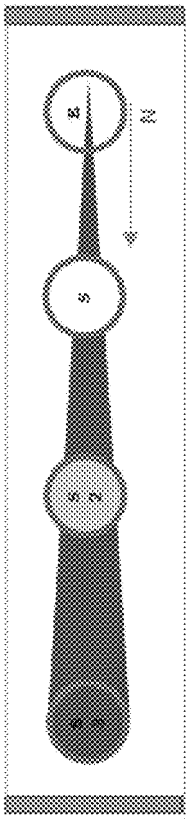

FIGS. 2D and 2E show examples where additional transmitter entities S2, S3 are arranged in the vicinity of the receiver entity E. This enhances the overall received signal strength at the receiver entity and, thus, the density of the radio access entities is enhanced to a medium level (FIG. 2D) and to a high level (FIG. 2E), respectively. As a consequence, the receiver entity E can react by adapting its own signal transmit power to a medium level in FIG. 2D (in indicated by the letter M) or to a low level in FIG. 2E (indicated by the letter L).

In general, it can be deducted that the density of the radio access entities (i.e., the metric) is anti-proportional to an optimal signal transmit power of a receiver radio access entity E.

The metric can be calculated solely based on knowledge of signal transmit powers (transmitted and received) of neighboring radio access entities within a certain frequency band, and no additional client-data, position information and dampening information (e.g., walls) are needed.

For instance, the metric is calculated 131 as a sum or a weighted sum of: the received signal strength values of the first wireless test signal which is transmitted from the at least some radio access entities and received by the one radio access entity, and/or the received signal strength values of the second wireless test signal which is transmitted from the one radio access entity and received by the at least some radio access entities.

In particular, each received signal strength value indicates a signal drop of the respective test signal between transmission and reception.

Receiving the first wireless test signal at the one access point from several other radio access entities and calculating a sum of the thus received signal strength values can be sufficient to calculate the metric. By also considering the received signal strength of the second wireless test signal (which is emitted from the one entity and received at other radio access entities), the metric can be further improved, since both signal directions can be considered.

Thereby, each received signal strength value of the first wireless test signal which is received from one of the at least some radio access entities can be limited to a maximum value. Likewise, each a received signal strength value of the second wireless test signal which is received at one of the at least some radio access entities can be limited to a maximum value. In this way, the influence of single entities on the resulting metric can be limited.

Figure 3:
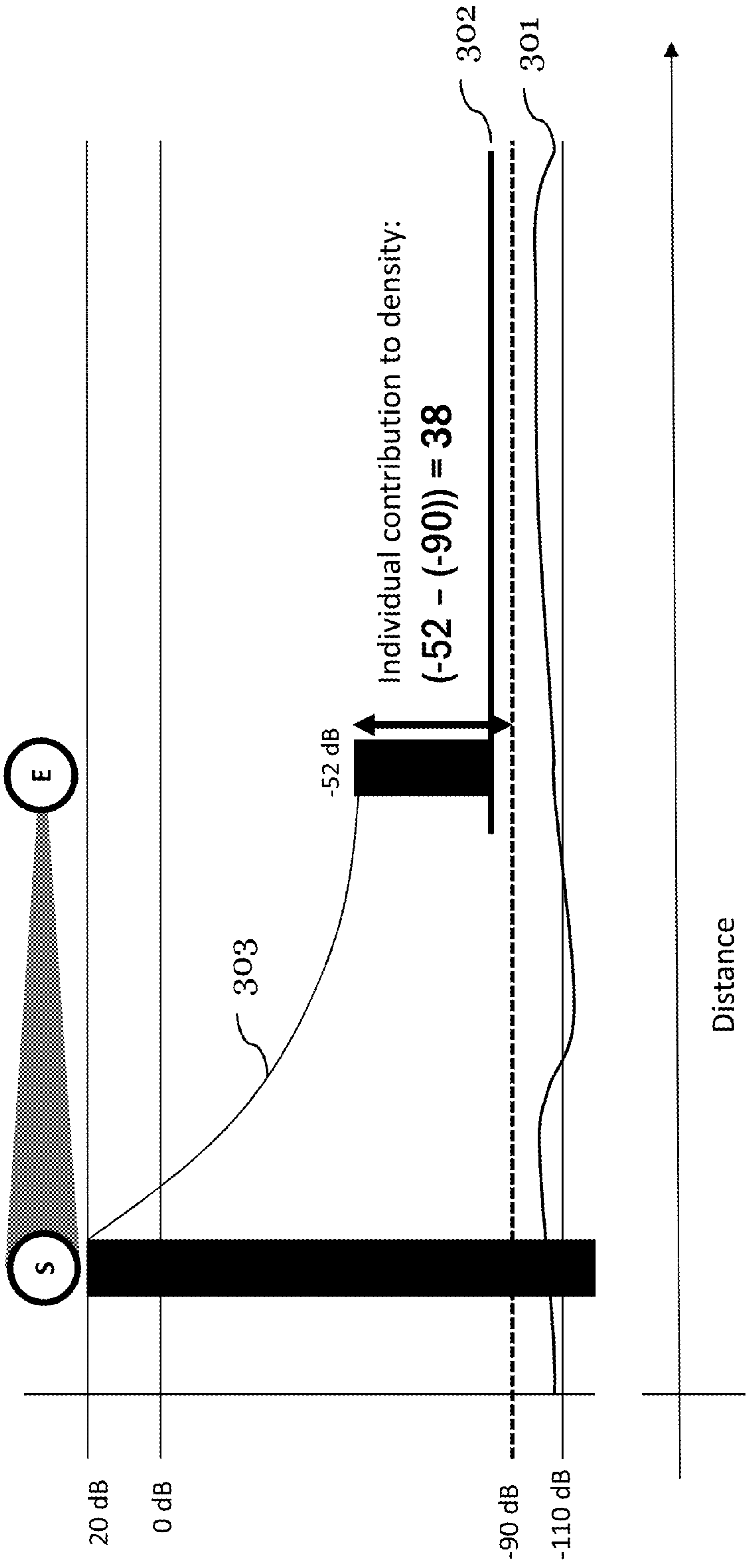
FIG. 3 shows a power level of a wireless test signal according to an embodiment.

FIG. 3 shows an example of a drop of a signal power 303 from a transmitter entity S to a receiver entity E. Thereby, the contribution of the received signal to the metric (density) is calculated based on the overall signal drop of the test signal. Furthermore, the receiver sensitivity 302 (e.g., −88 dB) and the noise level 301 are indicated.

The contribution of the received signal to the metric can be limited to a maximum value of 50, e.g. to avoid the influence of certain mounting situation (e.g., four entities mounted on the same pole). For instance, a received signal value (VALUE) would can be limited to a maximum of 50 by using the following mathematical operation: MIN (50, VALUE).

Figure 4B:
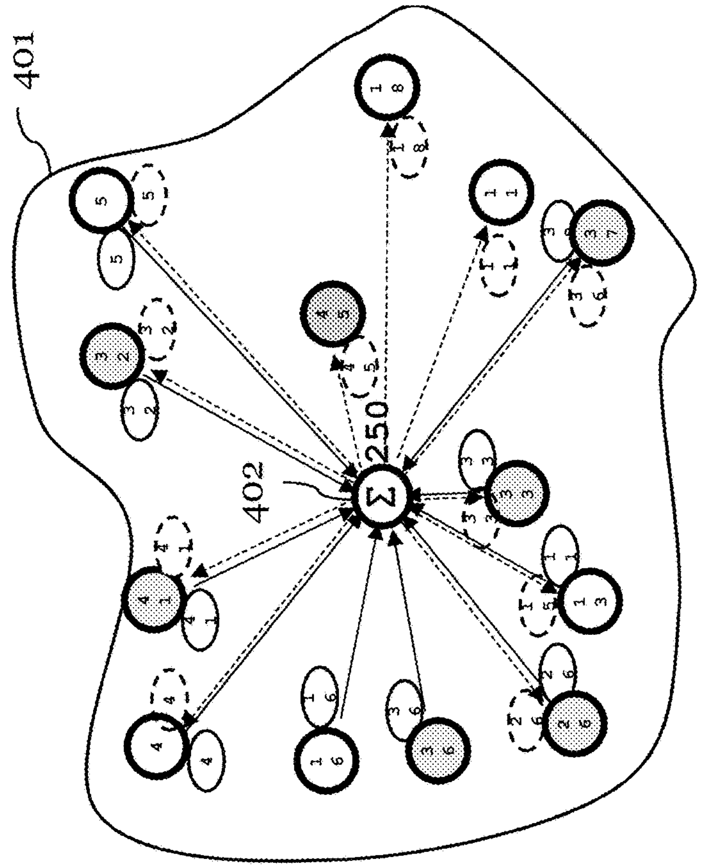
FIGS. 4A-4B show schematic diagrams of a plurality of wireless access entities in an environment according to an embodiment.
Figure 4A:
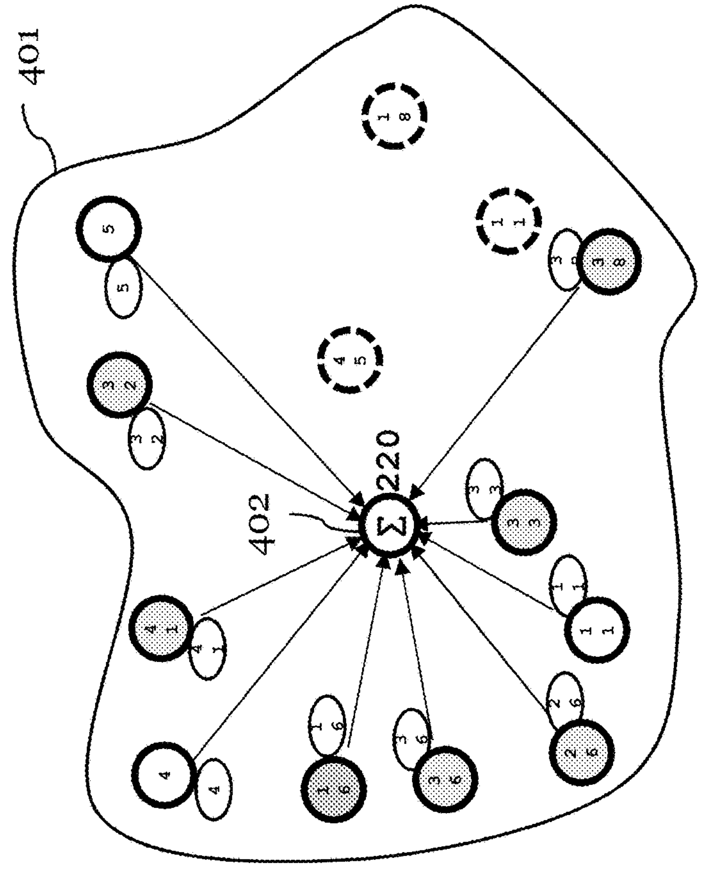

FIG. 4A-B show schematic diagrams of a plurality of wireless access entities in an environment 401 according to an embodiment.

Thereby, the center radio access entity 402 corresponds to the one (selected) radio access entity for which the signal transmit power is adjusted. The further radio access entities (here: 5, 32, 41, 4, 16, 36, 26, 11, 33, 36, 11, 45, and 18) can comprise: receivable radio access entities of the same wireless network, non-receivable radio access entities of the same wireless network, receivable radio access entities of different wireless network, and non-receivable radio access entities of a different wireless network. Ideally, the signal transmit powers of all radio access entities within the same wireless network should be optimized to each other.

Firstly, a number of entities which will be used for adapting the signal transmission power of the one entity 402 can be selected. The limitation to a certain number of entities allows comparability of different scenarios. The number of radio access entities can be chosen based on a spatial geometry (e.g., 6 or 8), or based on best practice considerations (e.g., for WiFi optimization at 2.4 GHz or 5 GHz), or randomly. For instance, a selected number can be seven.

Then, the relevant, closest radio access points can be chosen (up to the selected number). Thereby, radio access entities can be ignored whose contribution to the access point density (metric) is below a certain value (X dB). The proximity of radio access entities can be measured based on the signal level. The closer a radio access entity to the one entity 402, the more relevant it is.

As shown in FIG. 4A, the thus chosen radio access points can be configured to transmit the first test signal to the one radio access entity 402. In FIG. 4A, each radio access point, which transmits the first test signal, is highlighted by an additional oval circle. Furthermore, the signal transmission is indicated by bold arrows. The one radio access entity 402 can receive the respective first test signals and determine for each receipt, a contribution to the density of the radio access entity (i.e., to the metric). The resulting metric in this example is 220.

In the example shown in FIG. 4A, only received signal strengths at the one radio access entity 402 are considered when calculating the metric (Rx case).

FIG. 4B shows a further example, where the one radio access entity 402 further transmits the second test signal towards a number of further radio access entities, which can be radio access entities from the same or other networks (local Rx+remote Tx). This transmission is indicated by dashed arrows. The further radio access entities which receive the second test signal are further highlighted by dashed oval circles. The received signal strength at the further radio access entities can also be used to calculate the density of the radio access points (i.e., the metric).

In yet another alternative, a weighted sum of the received signal strengths of the first test signal (at entity 402) and of the received signal strengths of the second test signals (at the further entities) can be used to calculate the metric. In the example shown in FIG. 4B, this calculation results in a metric value of 250.

To determine an adjusted signal transmit power of the one radio access entity 402, the calculated metric can be mapped to a target signal transmit power based on a mapping function. This is indicated by the optional step 132 in FIG. 1.

The mapping function can be a monotone function or a step function. FIGS. 5-8 show examples of mapping functions 501-503, which are step functions.

The mapping functions can provide a target transmit power (in dBm) as a function of the metric (indicated as AP-density in FIGS. 5-8).

Figure 5:
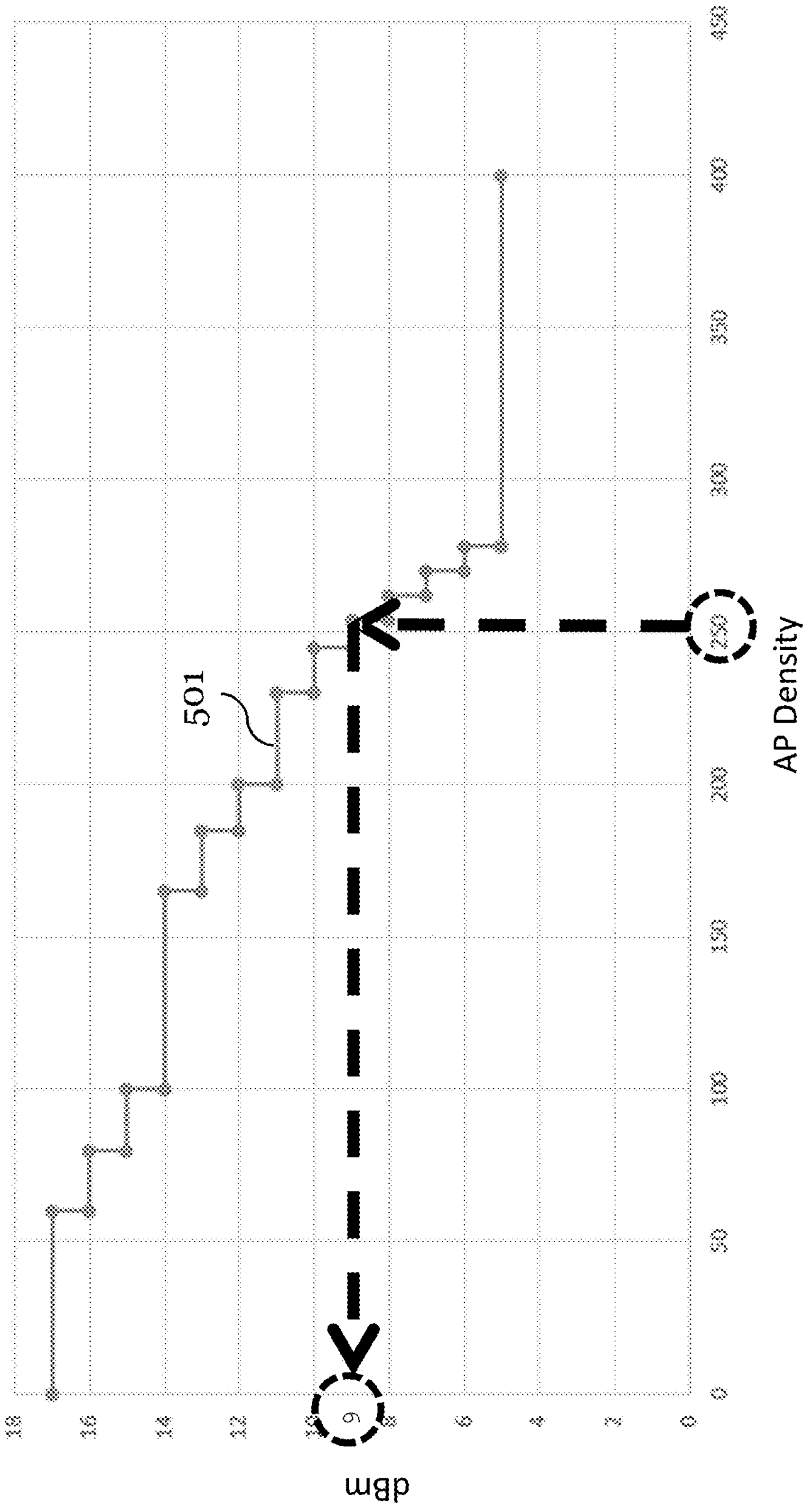
FIGS. 5-8 show examples of mapping functions according to an embodiment.

As shown in FIG. 5, a mapping function 501 can decline monotonically (in steps) with increasing value of the metric, wherein the decline is enhanced at higher metrics (e.g., for considering HD scenarios). In the example shown in FIG. 5, a metric of 250 results in a target transmit power of 9 dBm.

The mapping function can be further adjusted, e.g. dependent on a frequency and/or a bandwidth of the test signal(s) and/or different mapping functions can be used depending on the signal frequency and/or bandwidth of the test signal (s), and or the direction of the test signal(s) (e.g, Rx-only, Tx-only, Rx+Tx). This optional adjustment step 133 is also indicated in FIG. 1.

Figure 6:
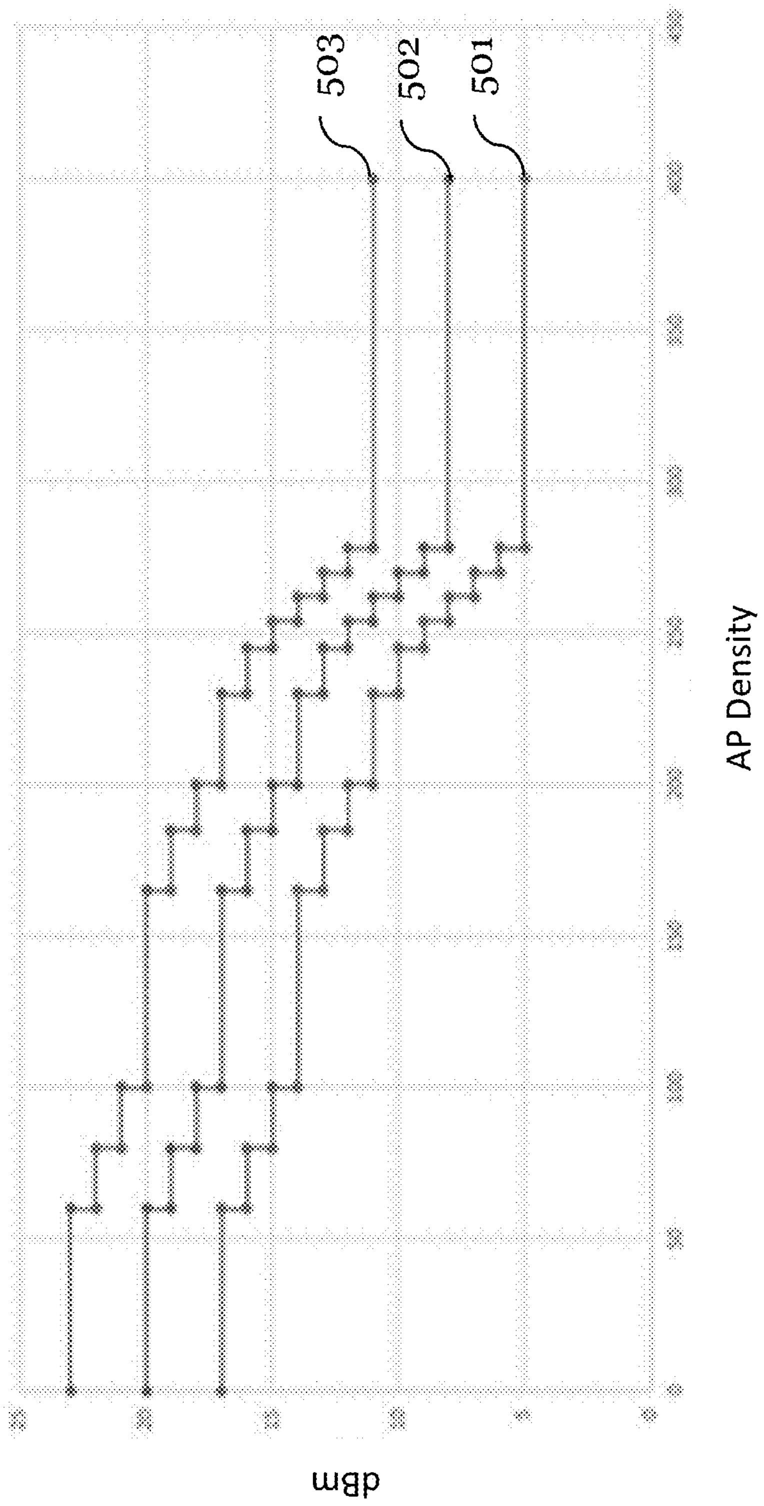

For instance, FIG. 6 shows three mapping functions 501-503 which are offset relative to their y-axis. Each mapping function can be used for a different signal frequency and/or bandwidth. Depending on the use case, also a horizontal offset is possible.

Figure 7:
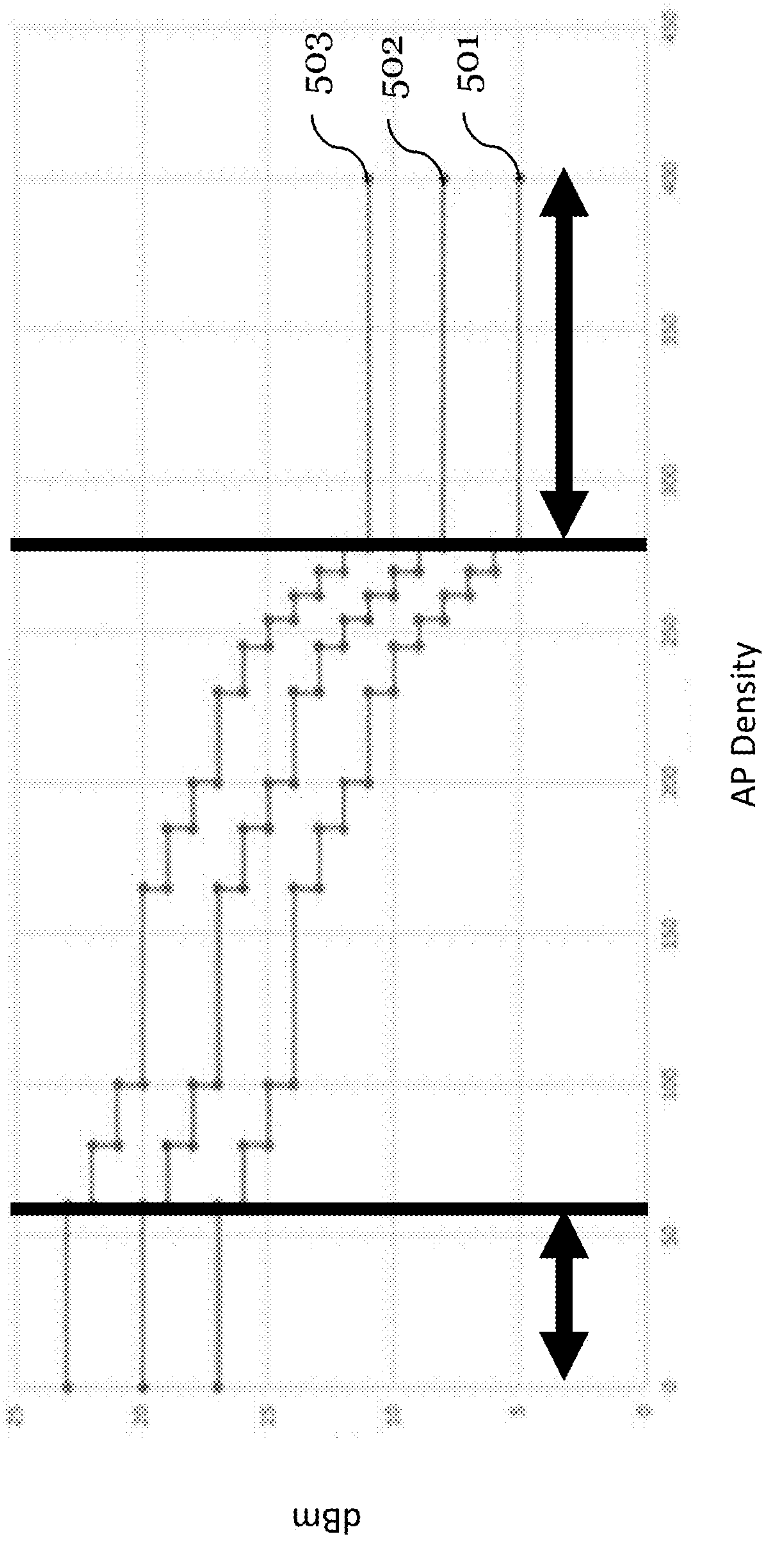
Figure 8:
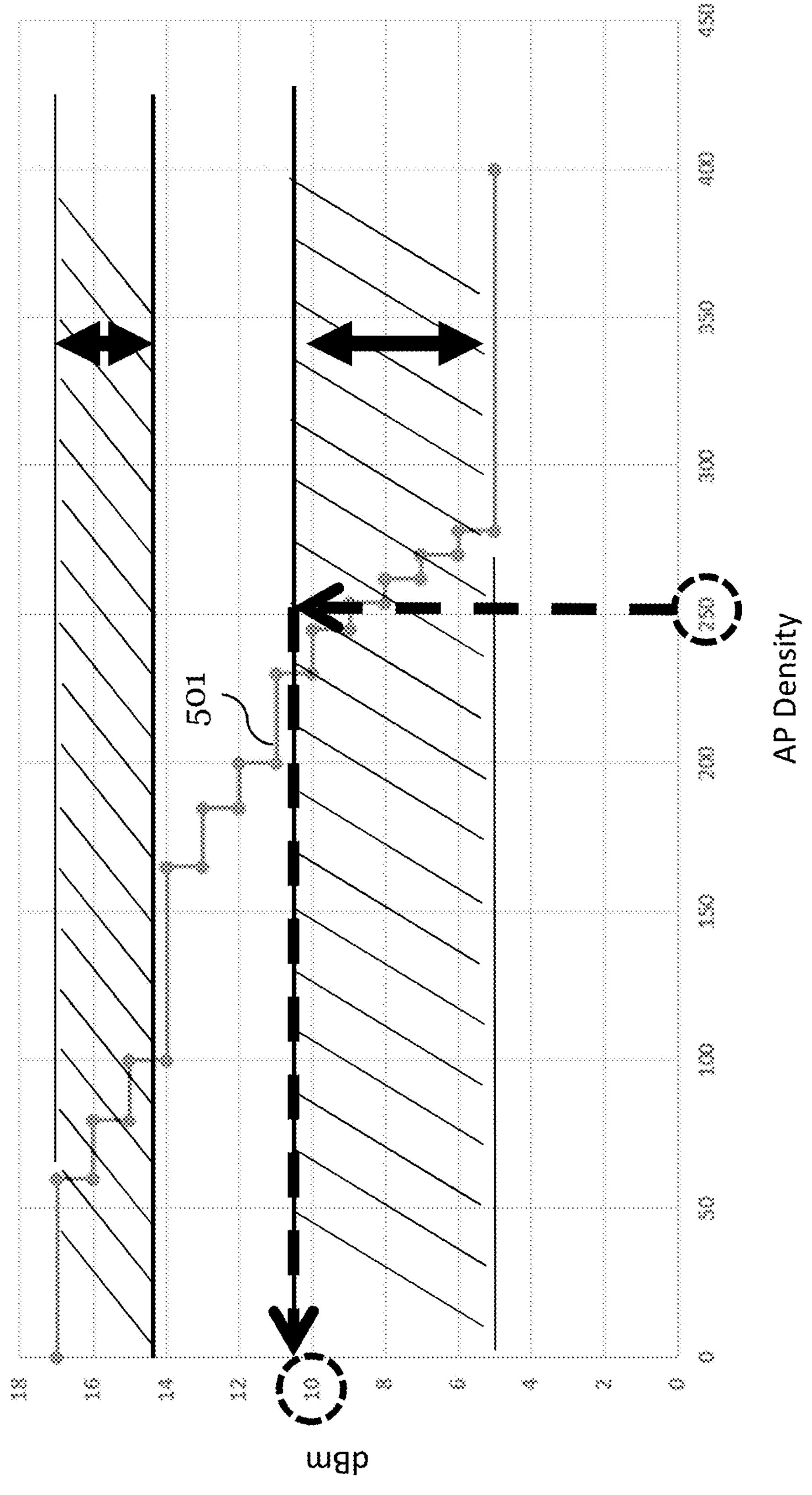

As shown in FIG. 7, the mapping function can be designed to have an upper and/or a lower limit above respectively below which the mapping function stays constant (e.g., max. to min. values of the mapping function can be from 5 to 17 dBm or from 11 to 23 dBm).

Furthermore, min/max values and/or boundaries can be added to mapping functions (e.g., by an administrator). In the example shown in FIG. 8, a min. target transmit power of 10.5 dB is selected for the mapping function.

For instance, the mapping function can be adapted by a user to achieve different effects, such as power conservation, enhanced coverage, avoidance of network conflicts in real life, etc.

After the signal transmit power of one radio access entity is adjusted according to the method 100 shown in FIG. 1, a further one radio access entity of the plurality of radio access entities can be selected and the steps of the method 100 can be repeated to also adjust the signal transmit power of the further one radio access entity. This procedure can be repeated until the signal transmit power of all radio access entities of the plurality of radio access entities is adjusted. Furthermore, the method can be repeated with test signals of different frequencies and/or within different frequency bands to individually adjust the signal transmit power of the radio access entities for different frequencies.

In this way, each wireless access entity of a wireless communication network can adapt its signal transmit power (and can thereby choose a suitable cell size). The decisions required for this adjustment can be based upon received signal strengths of test signal(s) which are transmitted by other radio access entities in the network.

Figure 9:
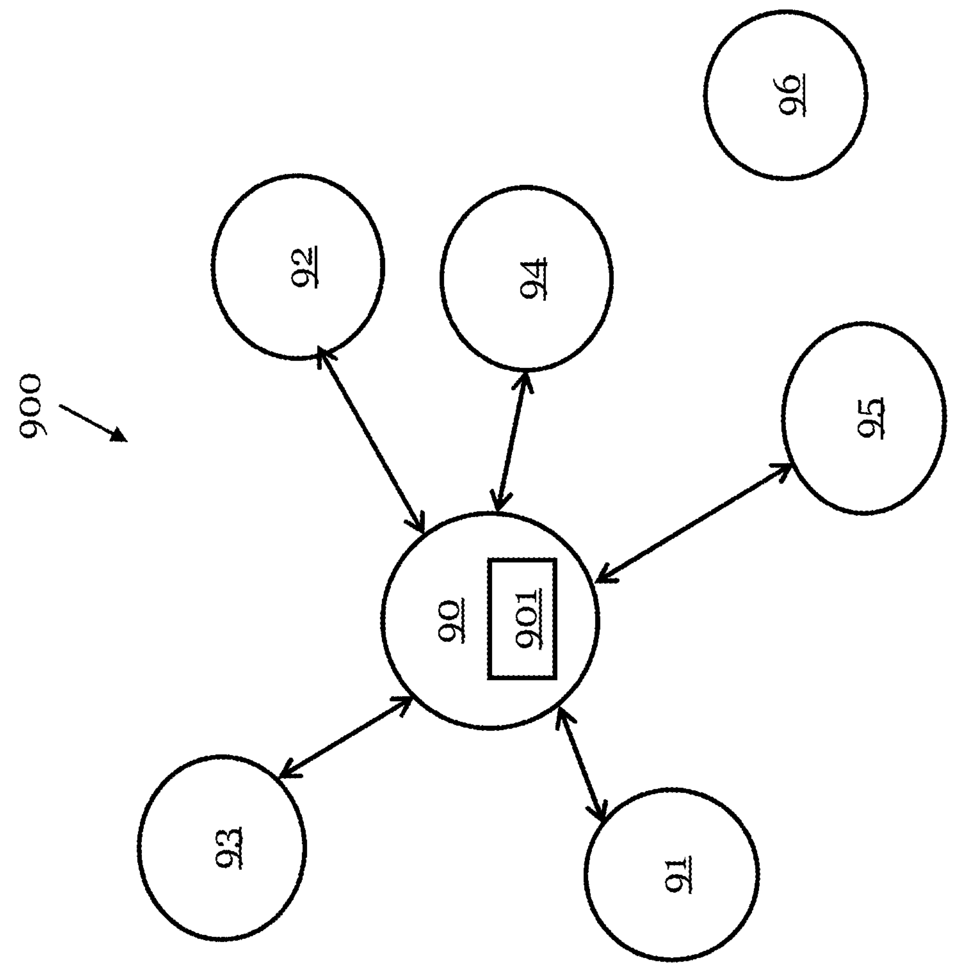
FIG. 9 shows a schematic diagram of a wireless communication system according to an embodiment.

FIG. 9 shows a schematic diagram of a wireless communication system 900 according to an embodiment.

The wireless communication system 900 comprises: the plurality of radio access entities 90-96 which are connected to the wireless communication network; and a control unit 901 which is configured to obtain, for one radio access entity 90 of the plurality of radio access entities 90-96: information on received signal strengths of the first wireless test signal which is transmitted from at least some radio access entities 91-95 of the plurality of radio access entities and received by the one radio access entity 90 and, and/or information on received signal strengths of the second wireless test signal which is transmitted from the one radio access entity 90 and received by at least some radio access entities 91-95 of the plurality of radio access entities and. The control unit 901 is configured to analyze the obtained information; wherein the one radio access entity 90 is configured to adjust its signal transmit power based on the analysis.

The radio access entities 91-96 can be access points of the wireless communication network. For instance, the radio access entities 91-96 can facilitate a wireless communication between client devices (e.g., smartphones) over the wireless communication network.

The one radio access entity 90 can comprise the control unit 901. However, the control unit 901 could also be a central controller, which could be connected to the plurality of radio access entities 90-96 (e.g., by means of a LAN connection). In particular, in case of a receipt of the second test signal from the one radio access entity 90 to the at least some radio access entities 91-95, information on the received signal strength can be communicated back to the control unit 901 (e.g., via LAN).

For instance, each of the plurality of radio access entities 90-96 can comprise a respective control unit.

The control unit 901 can be configured to calculate the metric on the basis of the obtained information.

For example, the control unit 901 is configured to calculate the metric as a sum or a weighted sum of: the received signal strength values of the first wireless test signal which is transmitted from the at least some radio access entities and received by the one radio access entity, and/or the received signal strength values of the second wireless test signal which is transmitted from the one radio access entity and received by the at least some radio access entities.

The control unit can further be configured to map the calculated metric to a target signal transmit power based on the mapping function, wherein the one radio access entity 90 is configured to set its signal transmit power to the target signal transmit power.

The wireless communication system 900 can be configured to carry out the steps of the method 100 as shown in FIG. 1.

All features described above or features shown in the figures can be combined with each other in any advantageous manner within the scope of the invention.

The invention claimed is:

1. A method for transmit power adjustment in a wireless communication network which comprises a plurality of radio access entities, the method comprising the steps of:

obtaining, for one radio access entity of the plurality of radio access entities, information on received signal strengths of a first wireless test signal which is transmitted from at least some radio access entities of the plurality of radio access entities and received by the one radio access entity;

analyzing the obtained information based solely on the obtained information on received signal strengths without client data or position information, wherein the step of analyzing comprises calculating a metric on the basis of the obtained information as a weighted sum of received signal strength values of the first wireless test signal which is transmitted from the at least some radio access entities and received by the one radio access entity, wherein the step of analyzing further comprises mapping the calculated metric to a target signal transmit power based on a mapping function;

and adjusting a signal transmit power of the one radio access entity on the basis of said analysis.

2. The method of claim 1, wherein the first wireless test signal is transmitted from the at least some radio access entities with first signal transmit powers; and wherein the first signal transmit powers is taken into account during the analysis of the obtained information.

3. The method of claim 2, wherein the first signal transmit powers are known from a configuration of the radio access entities which transmit a respective wireless test signal; and/or wherein a radio access entities which transmits a respective wireless test signal is configured to communicate its signal transmit power together with the wireless test signals.

4. The method of claim 1, wherein, when calculating the metric, a received signal strength value of the first wireless test signal is limited to a maximum value.

5. The method of claim 1, wherein the signal transmit power of the one radio access entity is set to the target signal transmit power.

6. The method of claim 5, wherein the mapping function is a monotone function or a step function.

7. The method of claim 5, comprising the further step of:

adjusting a boundary, a shape and/or an offset of the mapping function.

8. The method of claim 7, wherein the adjustment of the mapping function is dependent on the frequency and/or bandwidth of the first test signal.

9. The method of claim 1, wherein the number of the at least some radio access entities which transmit the first wireless test signal is limited to a first number.

10. A wireless communication system, comprising:

a plurality of radio access entities which are connected to a wireless communication network; and a control unit which is configured to obtain, for one radio access entity of the plurality of radio access entities, information on received signal strengths of a first wireless test signal which is transmitted from at least some radio access entities of the plurality of radio access entities and received by the one radio access entity;

wherein the control unit is configured to analyze the obtained information based solely on the obtained information on received signal strengths without data or position information, wherein the analysis comprises calculating a metric on the basis of the obtained information as a weighted sum of received signal strength values of the first wireless test signal which is transmitted from the at least some radio access entities and received by the one radio access entity, wherein the analysis further comprises mapping the calculated metric to a target signal transmit power based on a mapping function; and wherein the one radio access entity is configured to adjust its signal transmit power on the basis of said analysis.

11. The system of claim 10, wherein the one radio access entity is configured to set its signal transmit power to the target signal transmit power.

* * * * *